United States Patent
Tillotson et al.

(10) Patent No.: US 9,948,866 B2
(45) Date of Patent: Apr. 17, 2018

(54) SYSTEMS AND METHODS FOR PROTECTING AGAINST HIGH-RADIANT-FLUX LIGHT BASED ON TIME-OF-FLIGHT

(71) Applicant: The Boeing Company, Chicago, IL (US)

(72) Inventors: Brian J. Tillotson, Kent, WA (US); Kathryn M. Neville, Seattle, WA (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 15/011,727

(22) Filed: Feb. 1, 2016

(65) Prior Publication Data

US 2017/0223249 A1 Aug. 3, 2017

(51) Int. Cl.
| | | |
|---|---|---|
| *H04N 5/235* | (2006.01) | |
| *G02B 23/08* | (2006.01) | |
| *G02B 23/12* | (2006.01) | |
| *G01S 7/48* | (2006.01) | |
| *G01S 7/495* | (2006.01) | |
| *G02B 26/04* | (2006.01) | |

(Continued)

(52) U.S. Cl.
CPC ......... *H04N 5/2353* (2013.01); *G01S 7/4804* (2013.01); *G01S 7/495* (2013.01); *G02B 23/08* (2013.01); *G02B 23/12* (2013.01); *G02B 23/06* (2013.01); *G02B 26/04* (2013.01); *G02F 1/01* (2013.01)

(58) Field of Classification Search
CPC . B64C 2201/127; B64C 39/024; B64D 47/08; F16M 11/10; F16M 11/18; F16M 11/2071; F16M 2200/04; G03B 15/006; G03B 16/561; G05D 1/0094; H04N 5/2253; H04N 5/23258; H04N 5/2328
See application file for complete search history.

(56) References Cited

U.S. PATENT DOCUMENTS

| | | | |
|---|---|---|---|
| 4,978,182 A | 12/1990 | Tedesco | |
| 5,448,395 A * | 9/1995 | Lopez | G02B 3/0037 250/208.1 |
| 5,831,769 A | 11/1998 | Smith | |

(Continued)

FOREIGN PATENT DOCUMENTS

| | | |
|---|---|---|
| EP | 1467237 A1 | 10/2004 |
| GB | 1133514 A | 11/1968 |
| GB | 2472130 A | 1/2011 |

OTHER PUBLICATIONS

Extended European Search Report dated Jun. 14, 2017 issued in European Patent Application No. 16204968.8 (European counterpart of the instant U.S. patent application).

*Primary Examiner* — Amy Hsu
(74) *Attorney, Agent, or Firm* — Ostrager Chong Flaherty & Broitman P.C.

(57) ABSTRACT

Systems and methods for preventing high-radiant-flux light, such as laser light or a nuclear flash, from causing harm to imaging devices, such as a camera or telescope. In response to detection of high-radiant-flux light, the proposed systems have the feature in common that a shutter is closed sufficiently fast that light from the source will be blocked from reaching the image sensor of the imaging device. Some of the proposed systems include a folded optical path to increase the allowable reaction time to close the shutter.

21 Claims, 12 Drawing Sheets

(51) Int. Cl.
*G02F 1/01* (2006.01)
*G02B 23/06* (2006.01)

(56) References Cited

U.S. PATENT DOCUMENTS

| | | | |
|---|---|---|---|
| 6,652,778 B1* | 11/2003 | Twarowski | C09K 9/02 252/582 |
| 7,202,852 B2 | 4/2007 | Harvie | |
| 7,344,260 B2* | 3/2008 | Derenski | B60J 3/02 296/97.4 |
| 2002/0149854 A1* | 10/2002 | Tanaka | G02B 17/0663 359/627 |
| 2007/0152099 A1* | 7/2007 | Moreau | B64D 7/00 244/117 R |
| 2015/0138355 A1* | 5/2015 | Tillotson | G01N 15/06 348/144 |
| 2015/0341139 A1* | 11/2015 | Bradley | H04K 3/825 348/143 |

\* cited by examiner

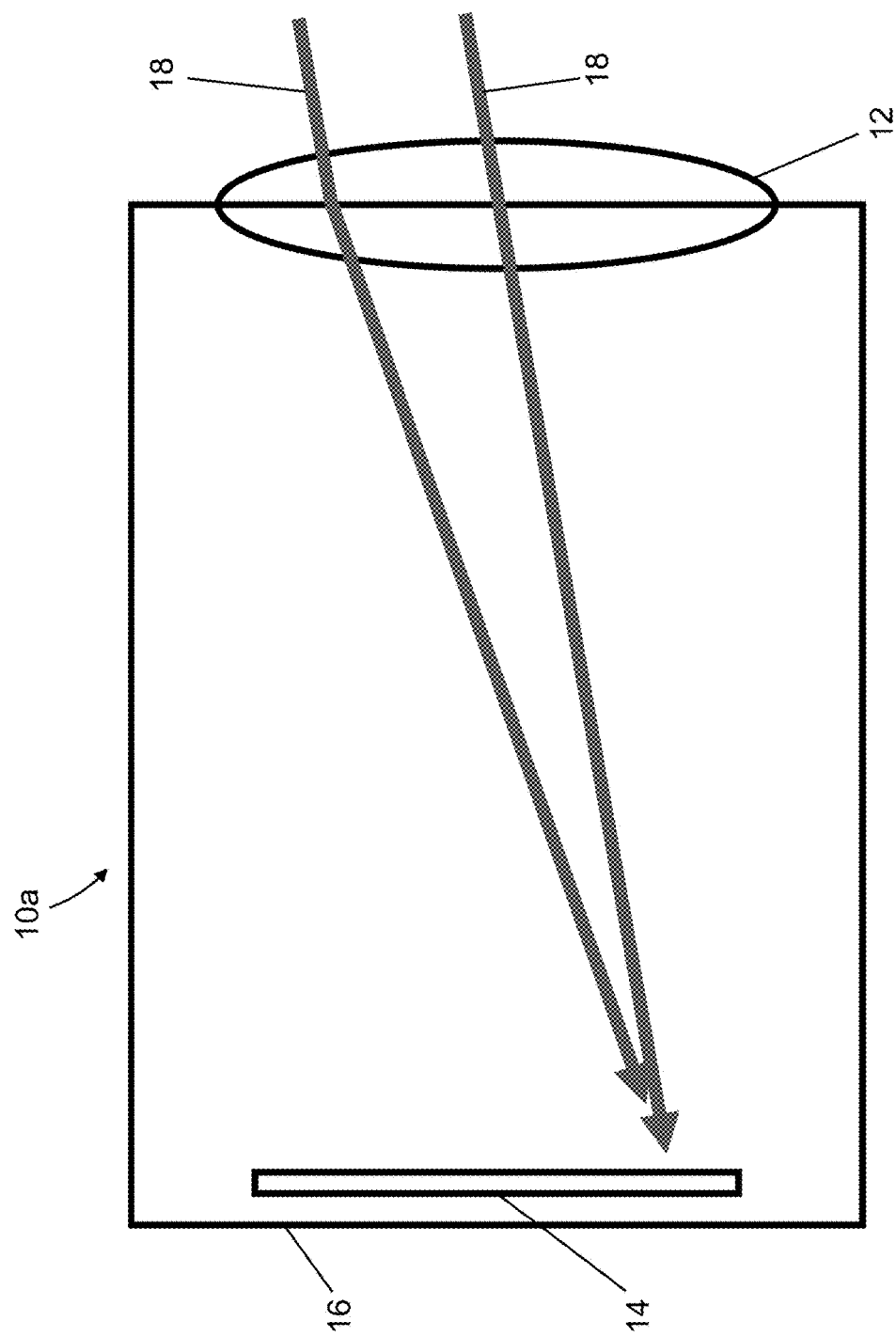

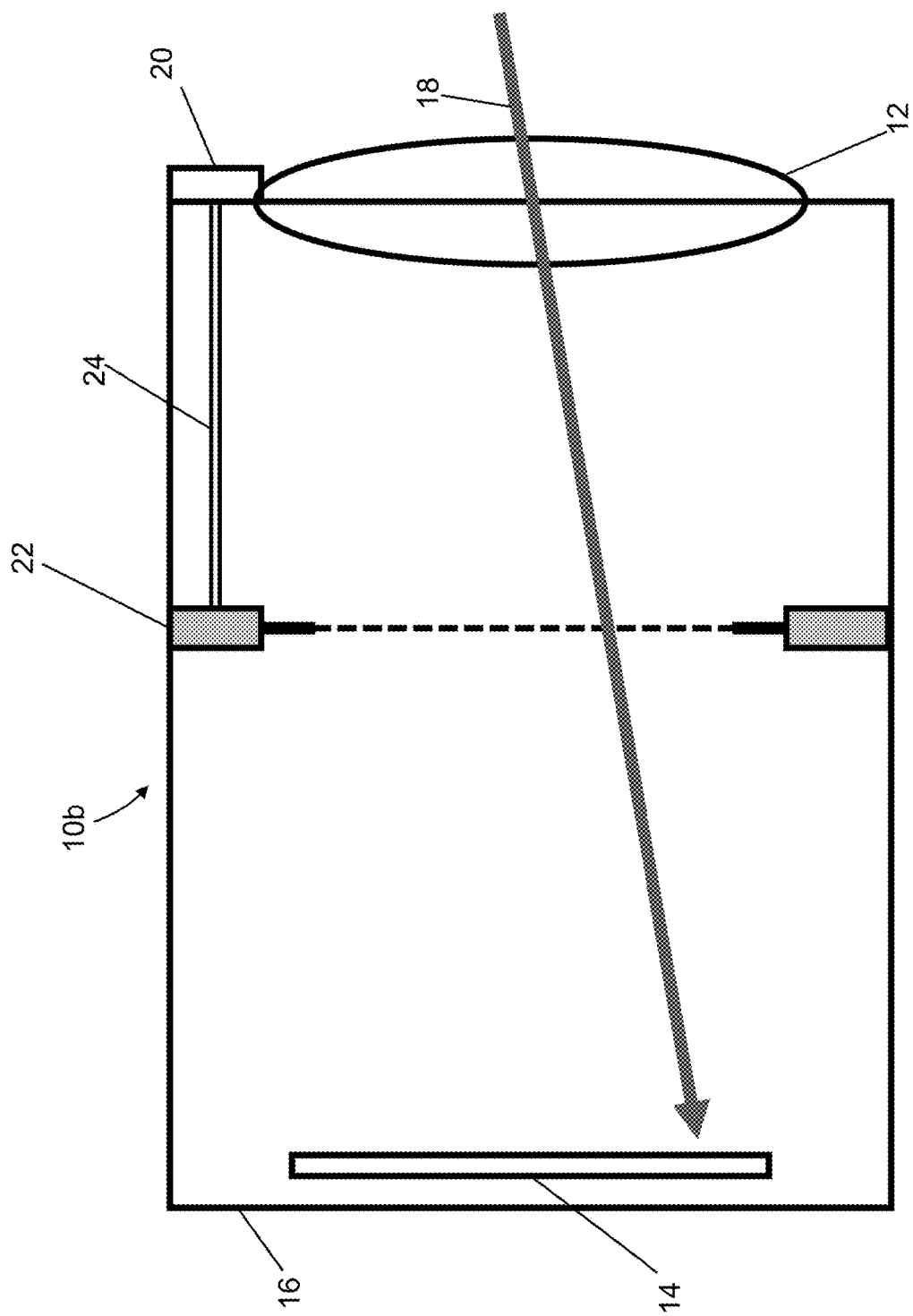

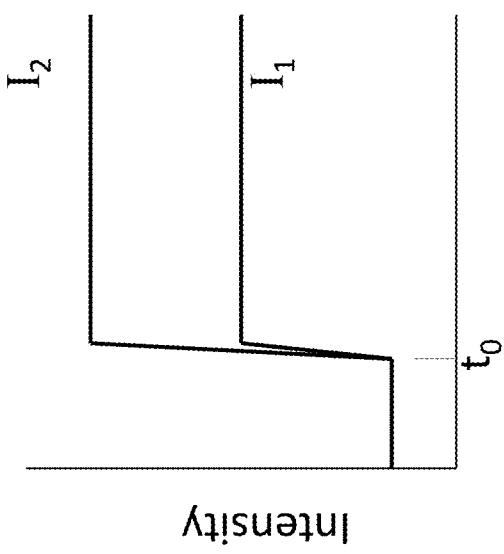
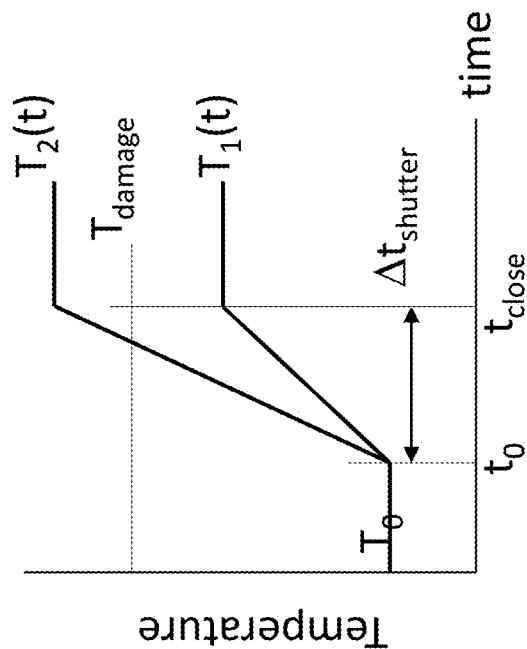
FIG. 3A
FIG. 3B

SYSTEMS AND METHODS FOR PROTECTING AGAINST HIGH-RADIANT-FLUX LIGHT BASED ON TIME-OF-FLIGHT

BACKGROUND

This disclosure generally relates to systems and methods for the protection of imaging devices against light having a high radiant flux. As used herein, the term "high-radiant-flux light" means light having any one or more of the following measurable properties: high radial intensity (W/sr), high irradiance ($W/m^2$) and high radiance ($W \cdot sr^{-1} \cdot m^{-2}$). Such high-radiant-flux light may be coherent (e.g., laser light) or incoherent.

A general problem is to achieve high probability of mission success, at acceptably low cost, despite hazards. A hazard of increasing concern is high-radiant-flux light, which can damage optical sensors (hereinafter "image sensors") needed to (a) operate a vehicle safely or (b) collect data, such as agricultural data or military surveillance data. This hazard usually arises from lasers aimed at a vehicle. However, it may also arise from arc welding equipment, exceptionally large or hot fires, a lightning bolt, or a nuclear blast.

Imaging devices, such as cameras and telescopes, are especially vulnerable to high-radiant-flux light. By design, such imaging devices use a lens or mirror to focus light onto an image sensor (such as a focal plane array) comprising a multiplicity of pixels. This greatly increases the light intensity on pixels corresponding to the location of the high-radiant-flux light source in the image. Thus, light that is harmless to a structural surface may have damaging radiant flux at the image sensor. The high-radiant-flux light can damage the image sensor by thermal shock, melting, or other mechanisms.

One approach to solving this problem is using a laser sensor to detect the presence of high-radiant-flux light in the imaging device's field of view. As used herein, the term "laser sensor" means a sensor that detects high-radiant flux light (defined above). (For avoidance of doubt, it should be noted that the term "laser sensor" as used herein does not mean a sensor that detects laser light only or a sensor that detects all laser light. Instead the laser sensor detects any light having a radiant flux in excess of a specified threshold, including but not limited to high-radiant-flux laser light.) The laser sensor transmits a signal via a signal line to a shutter inside the imaging device. The shutter closes, blocking the light from reaching the image sensor of the imaging device. This approach suffices for the weakest threats, such as accidental exposure to lasers used in a light show, but it is insufficient for the more intense light commonly encountered in military situations due to reaction time delays in such a system.

It would be advantageous to equip imaging devices with protection systems that can block even the highest-intensity light before it damages the image sensor.

SUMMARY

The subject matter disclosed in detail below is directed to systems and methods for preventing high-radiant-flux light, such as laser light or a nuclear flash, from causing harm to imaging devices, such as a camera or telescope. In response to detection of high-radiant-flux light, the proposed systems share the common feature that a shutter is closed sufficiently fast that light from the source will be blocked from reaching the focal plane of the imaging device. Most of the proposed systems include a folded optical path to increase the allowable reaction time for closing the shutter.

One aspect of the subject matter disclosed in detail below is an imaging device comprising: a laser sensor configured to output an activation signal in response to impingement thereon of light having a radiant flux greater than a specified threshold; an image sensor comprising a multiplicity of elements that convert impinging light to electrical signals; a first path-bending optical component disposed along an optical path that extends from a point in a vicinity of the laser sensor to the image sensor; a first shutter disposed along a portion of the optical path that extends from the first path-bending optical component to the image sensor; and a signal line connected to carry the activation signal from the laser sensor to the first shutter. The laser sensor, the signal line and the first shutter can be configured so that in response to some light and other light, both having a radiant flux greater than the specified threshold, concurrently arriving at the laser sensor and a starting point of the optical path respectively, the first shutter will become opaque prior to the other light impinging thereon in response to receipt of the activation signal from the laser sensor via the signal line. The optical path is configured to produce a time-of-flight delay for light traveling from the vicinity of the laser sensor to the first shutter, and the laser sensor, the signal line, and the first shutter are configured to produce a shutter delay from the time a high-radiant-flux arrives at the laser sensor to the time the first shutter becomes opaque, wherein the time-of-flight delay is greater than the shutter delay. The imaging device may further comprise a second shutter disposed along a portion of the optical path that extends from the first path-bending optical component to the first shutter. In accordance with one embodiment, the first shutter comprises an electro-optical shutter and the second shutter comprises a mechanical shutter.

Another aspect of the subject matter disclosed in detail below is an instrument comprising: a laser sensor configured to output an activation signal in response to impingement thereon of light having a radiant flux greater than a specified threshold; a first path-bending optical component disposed along an optical path that extends from a point in a vicinity of the laser sensor to a focal plane of the instrument; a shutter disposed along a portion of the optical path that extends from the first path-bending optical component to the focal plane; and a signal line connected to carry the activation signal from the laser sensor to the shutter. The instrument may further comprise second, third and fourth path-bending optical components, wherein the second path-bending optical component is disposed along a portion of the optical path that extends from the first path-bending optical component to the focal plane, the third path-bending optical component is disposed along a portion of the optical path that extends from the second path-bending optical component to the focal plane, and the fourth path-bending optical component is disposed along a portion of the optical path that extends from the third path-bending optical component to the focal plane.

A further aspect is an imaging device comprising: a laser sensor configured to output an activation signal in response to impingement thereon of light having a radiant flux greater than a specified threshold; an image sensor comprising a multiplicity of elements that convert impinging light to electrical signals; means for increasing a time-of-flight of light along an optical path that extends from a point in a vicinity of the laser sensor to the image sensor; a shutter disposed along a portion of the optical path that extends from the volume of substance having a high index of refraction to the image sensor; and a signal line connected to carry the activation signal from the laser sensor to the first shutter. In some embodiments, the structure that performs the function of increasing a time-of-flight of light along an optical path comprises a volume of substance having a high index of refraction. In other embodiments, the structure that performs the function of increasing a time-of-flight of light along an optical path comprise one or more reflective surfaces.

Yet another aspect of the subject matter disclosed below is a method comprising: (a) detecting a radiant flux entering an optical instrument that has above a specified threshold; (b) when the specified threshold is reached or exceeded, sending an activation signal via a signal line to a shutter disposed inside the optical instrument; (c) delaying the arrival of the entering light at a shutter inside the optical instrument by an amount of time equal to a time-of-flight delay; and (d) in response to sending of the activation signal, the shutter becomes opaque at a time which is subsequent to a time when step (a) occurs by a total shutter delay, wherein the time-of-flight delay is greater than the total shutter delay.

Other aspects of systems and methods for the protection of imaging devices against high-radiant-flux light are disclosed below.

BRIEF DESCRIPTION OF THE DRAWINGS

FIG. 1 is a diagram representing an imaging device that is focusing incoming light onto a focal plane, thereby increasing the light's intensity.

FIG. 2 is a diagram representing an imaging device equipped with a shutter that can be activated to close when high-radiant-flux light is detected by a laser sensor.

FIG. 3A is a graph of light intensity at a focal plane of an imaging device versus time for two laser attacks of differing intensities $I_1$ and $I_2$.

FIG. 3B is a graph of temperature at a focal plane of an imaging device versus time for two laser attacks that would produce the respective intensity profiles depicted in FIG. 3A.

Reference will hereinafter be made to the drawings in which similar elements in different drawings bear the same reference numerals.

DETAILED DESCRIPTION

Figure 4:
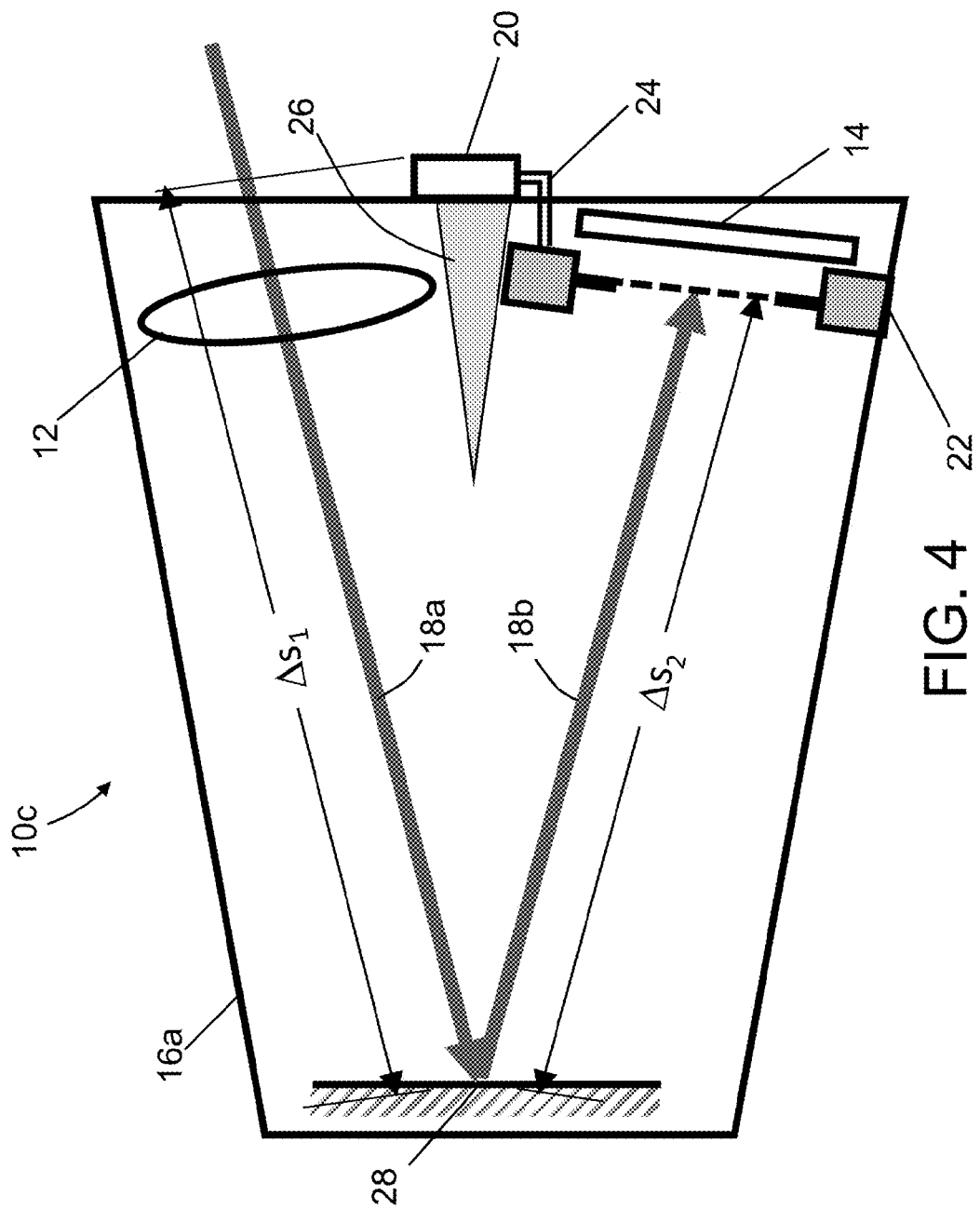
FIG. 4 is a diagram depicting structural and functional aspects of an imaging device equipped with a protection system having one shutter in accordance with a first embodiment.

Illustrative embodiments of a protection system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

By design, an imaging device uses a lens or mirror to focus light onto an image sensor. FIG. 1 depicts an imaging device 10a that has a lens 12, an image sensor 14, and a housing 16. The housing 16 has an aperture through which incident light propagates on its way to the focal plane of the imaging device 10a. The arrows in FIG. 1 indicate optical paths 18 of respective incoming light rays 18 that are being focused by the lens 12 onto a portion of the image sensor 14, thereby increasing the light's intensity. (Other light rays are not shown to avoid clutter in the drawing.) This greatly increases the intensity on pixels corresponding to the location of the high-radiant-flux light source in the image. Thus, light that is harmless to a structural surface may have damaging intensity at the image sensor 14.

One approach to solving this problem is depicted in FIG. 2, which shows an imaging device 10b that has a lens 12, an image sensor 14, a laser sensor 20, and a shutter 22, all of which components may be attached directly or indirectly (by support means not shown) to a housing 16. The laser sensor 20 detects the presence of high-radiant-flux light in the imaging device's field of view. The laser sensor 20 transmits an activation signal via a signal line 24 to the shutter 22 when high-radiant-flux light is detected. In response to receipt of that activation signal, the shutter 22 becomes opaque, thereby blocking at least some of the incoming light from reaching the image sensor 14 disposed at the focal plane of the imaging device 10b.

The approach depicted in FIG. 2 may be insufficient for blocking the intense light commonly encountered in military situations. The reason for this insufficiency lies in the following three delays: (1) the laser sensor response time $\Delta t_{sensor}$ (any laser sensor requires a non-zero time to detect the arrival of high-radiant-flux light and send a signal); (2) the signal transit time $\Delta t_{transit}$ (the signal must travel from the laser sensor 20 to the shutter 22; it cannot travel faster than the speed of light, 0.3 meter per nanosecond); and (3) the shutter response time $\Delta t_{response}$ (no shutter can close instantly; it requires a nonzero reaction time to become opaque after a signal arrives; the shorter the reaction time, the more costly the shutter). These delays can be summed to produce a single value $\Delta t_{shutter}$, which is the total shutter delay from when high-radiant-flux light arrives at the laser sensor 20 to when the shutter 22 becomes opaque.

FIG. 3A is a graph of light intensity at an image sensor versus time for two laser attacks of differing intensities $I_1$ and $I_2$. FIG. 3B is a graph of temperature at the same image sensor versus time for the same laser attacks.

The plot labeled $I_1$ in FIG. 3A represents a relatively low-intensity attack beginning at time $t_0$. The plot labeled $T_1(t)$ in FIG. 3B represents the corresponding temperature at the focal plane. Starting at $t_0$, the temperature rises from an initial value $T_0$ toward the damage threshold $T_{damage}$. Before it reaches that threshold, the shutter 22 closes at time $t_{close}$. The temperature stops rising, and the image sensor 14 survives.

The plot labeled $I_2$ in FIG. 3A represents a higher-intensity attack. The plot labeled $T_2(t)$ in FIG. 3B represents the corresponding temperature at the focal plane. As above, the temperature rises from the initial value $T_0$, but given the higher intensity $I_2$, the temperature rises faster than in the weak attack. The temperature exceeds the damage threshold $T_{damage}$ before the shutter 22 closes at $t_{close}$. In this event, the image sensor 14 may be damaged or destroyed. In contrast, the protection systems described in detail below can block even the highest-intensity light before it damages the focal plane.

FIG. 4 depicts structural and functional aspects of an imaging device 10c equipped with a protection system in accordance with a first embodiment. The imaging device 10c comprises the following elements: a lens 12 (or other image-forming optics), an image sensor 14 (or other image sensor); a mirror 28 (or other path-bending optic(s); a laser sensor 20; a shutter 22 (electro-optical, mechanical, etc.); a signal line 24 (a wire, coaxial cable, or optical fiber); a housing 16a having an aperture; and a baffle 26. As shown in FIG. 4, the mirror 28 reflects light from the lens 12 onto the image sensor 14. The shutter 22, when closed, blocks the light's path to protect the image sensor 14. The optical path length from a point near the laser sensor 20 to the shutter 22 via the mirror 28 is much longer than the length of the signal line 24 from the laser sensor 20 to the shutter 22. The elongated housing 16a surrounds and protects the components and the optical path. Baffle 26 blocks any light scattered by diffraction, dust or other blemishes on lens 12 from reaching shutter 22 via any path with an optical path length less than the optical path length from a point near the laser sensor 20 to the shutter 22 via the mirror 28.

In accordance with the embodiment depicted in FIG. 4, the process for protecting the imaging device 10c from incoming high-radiant-flux light includes the following major steps:

(1) The laser sensor 20 (placed near the aperture) detects light having a radiant flux above a specified threshold.

(2) When the specified threshold is reached or exceeded, the laser sensor 20 sends an activation signal (electrical or optical) via the signal line 24 to the shutter 22.

(3) Meanwhile, the high-radiant-flux light travels by a long optical path through the housing 16a. A first portion 18a of that optical path (indicated by a first arrow in FIG. 4 and having a length $\Delta s_1$) extends from a point in the vicinity of the laser sensor 20 to the mirror 28; a second portion 18b of that optical path (indicated by a second arrow in FIG. 4 and having a length $\Delta s_2$) extends from the mirror 28 to the shutter 22.

(4) In response to receipt of the activation signal from the laser sensor 20, the shutter 22 becomes opaque.

(5) When the high-radiant-flux light reaches the shutter 22 (now in an opaque state), enough of the incident light can be blocked to prevent damage to the image sensor 14.

(6) The laser sensor 20 detects a return to light levels below the specified threshold and sends a de-activation signal which causes the shutter 22 to open (i.e., become transparent).

In operation, the optical path length $\Delta s$ is long enough to impose a time-of-flight delay $\Delta s/c$, where c is the speed of light, and this time-of-flight delay is greater than the total shutter delay $\Delta t_{shutter}$. That is, $$\Delta s/c > \Delta t_{shutter} \qquad (1)$$

For a two-legged optical path as shown in FIG. 4, and showing all elements of $\Delta t_{shutter}$, this equation becomes:

$$(\Delta s_1 + \Delta s_2)/c > \Delta t_{sensor} + \Delta t_{transit} + \Delta t_{response} \qquad (2)$$

where $\Delta s_1$ is the optical path length from a point in the vicinity of the laser sensor 20 to the mirror 28, and $\Delta s_2$ is the optical path length from the mirror 28 to the shutter 22.

The common elements of the various imaging devices disclosed herein will be described more generally in the following individually entitled sub-sections.

Image Sensor

The image sensor 14 may comprise a staring focal plane array, such as a charge coupled device (CCD) sensitive to visible or infrared wavelengths. In the alternative, it can be a single-pixel camera (compressive imaging system), an imaging photomultiplier, a vidicon tube, a photochemical film, or others.

Image-Forming Optics

The image-forming optics may comprise a lens, a mirror, or a combination thereof that focuses light on the image sensor to create an image. It may be a single optical element such as the lens 12 shown in FIG. 4, or a multi-element system such as an achromatic lens, a Newtonian mirror system, or a Schmidt-Cassegrain lens-mirror combination.

Path-Bending Optics

The path-bending optics may comprise an optical element, such as a mirror 28, that changes the direction of light. Preferably, the direction is changed by at least 90°. This includes light that forms the image and light that can damage the image sensor. Changing the light's direction allows the path length of the light to be much greater than the path length for the shutter signal. Besides a single flat mirror 28 as shown in FIG. 4, this optical element may be a reflecting prism, multiple mirrors, or combinations thereof. In some embodiments (described n more detail later), the mirror is curved and is part of the image-forming optics.

Laser Sensor

The laser sensor is a photosensitive electronic device that has roughly the same field of view as the imaging device. When a sufficiently high-radiant-flux light appears in its field of view, the laser sensor transmits a signal quickly—typically in less than a nanosecond. As seen in FIG. 4, preferably the laser sensor 20 is positioned near the shutter 22 so the signal line 24 from the laser sensor 20 to the shutter 22 will be short. The laser sensor 20 is typically much less sensitive than the image sensor 14, as it only needs to respond to high-radiant-flux light. It can also survive exposure to light having a higher radiant energy than what the image sensor 14 can be exposed to. A typical laser sensor comprises a processor having a thresholding function, a photodetector, and a lens or other focusing element to provide directionality.

Shutter

The shutter 22 is a device that has two states. In one state, the shutter 22 at least partially blocks the passage of light. In the other state, the shutter 22 allows the passage of light. The shutter 22 may comprise crossed polarizers surrounding a fast-acting magneto-optical or electro-optical device such as a Pockels cell, a Kerr cell, a Faraday modulator, or an active-matrix liquid-crystal grid (similar to the technology used in liquid crystal displays). To give the shutter 22 as much time as possible to receive the activation signal and to respond, the shutter 22 is typically adjacent to the image sensor 14 and as close as possible to the laser sensor 20.

Signal Line

As depicted in FIG. 4, the signal line 24 carries a signal from the laser sensor 20 to the shutter 22. The signal line 24 is configured to take as direct a route as possible from laser sensor 20 to shutter 22. For an optical signal, the signal line 24 may be optical fiber (signal speed ~$2 \times 10^8$ m/s), or it may be a free-space path (perhaps shielded by a hollow tube) along which the signal moves at $3 \times 10^8$ m/s. For an electrical signal, the signal line 24 is configured to have minimal inductance and capacitance per unit length to achieve the highest possible signal speed.

Housing

Time must be given for the shutter 22 to receive the activation signal from the laser sensor 20 and to change state. Elongating the path that the light takes to reach the image sensor 14 allows this to occur. There are multiple housing designs which can be used. The key element is the distance the light must travel versus the distance the signal must travel. At 0.3 meter per nanosecond, a two-meter path gives six nanoseconds of delay. The housing 16a shown in FIG. 4 could be designed to achieve a two-meter path in one meter of length by positioning the mirror 28 one meter from each of the laser sensor 20 and the shutter 22.

Alternative embodiments of imaging devices equipped with protection systems will now be described in detail for the purpose of illustrating manifold ways in which the concept disclosed herein may be reduced to practice.

In some alternative embodiments, there is a second shutter which is mechanical. A mechanical shutter is too slow to act before the high-radiant-flux light reaches the image sensor, but once closed, it blocks 100% of the light. Affordable electro-optical shutters typically do not block 100% of the light, so some alternative embodiments use both types of shutters in tandem: the electro-optical shutter acts quickly to block most of the light, and the mechanical shutter subsequently blocks the rest of light.

Figure 5:
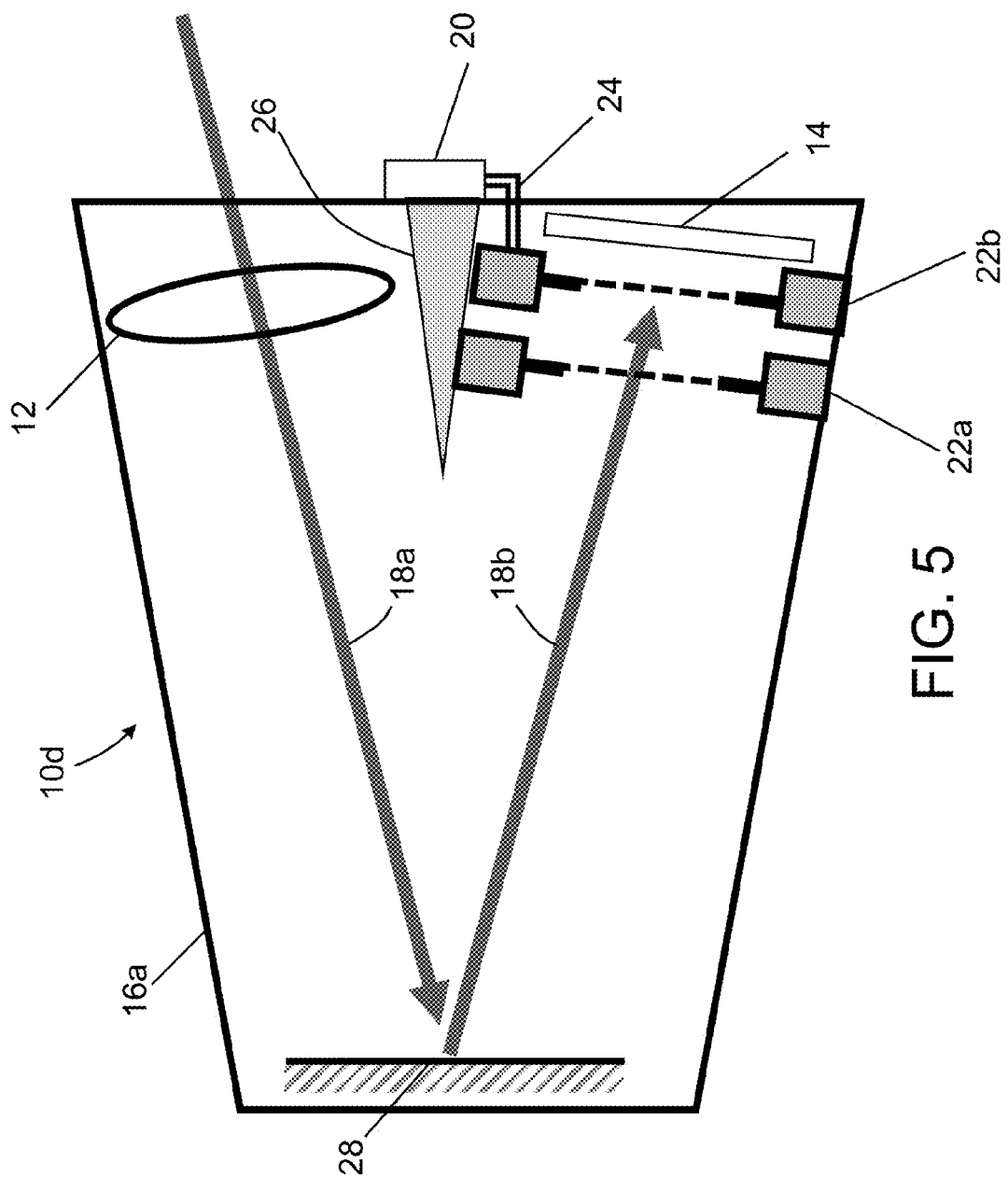
FIG. 5 is a diagram depicting structural and functional aspects of an imaging device equipped with a protection system having a slower mechanical shutter "upstream" from a faster electro-optical shutter in accordance with a second embodiment.

FIG. 5 depicts structural and functional aspects of an imaging device 10d equipped with a protection system in accordance with a second embodiment. In this embodiment, the protection system comprises a slower mechanical shutter 22a "upstream" from a faster electro-optical shutter 22b. The mechanical shutter 22a is tougher (i.e., more rugged) than the electro-optical shutter 22b, so as shown in FIG. 5, the mechanical shutter 22a is positioned to protect the weaker, more costly electro-optical shutter 22b from prolonged exposure to high-radiant-flux light.

Figure 6:
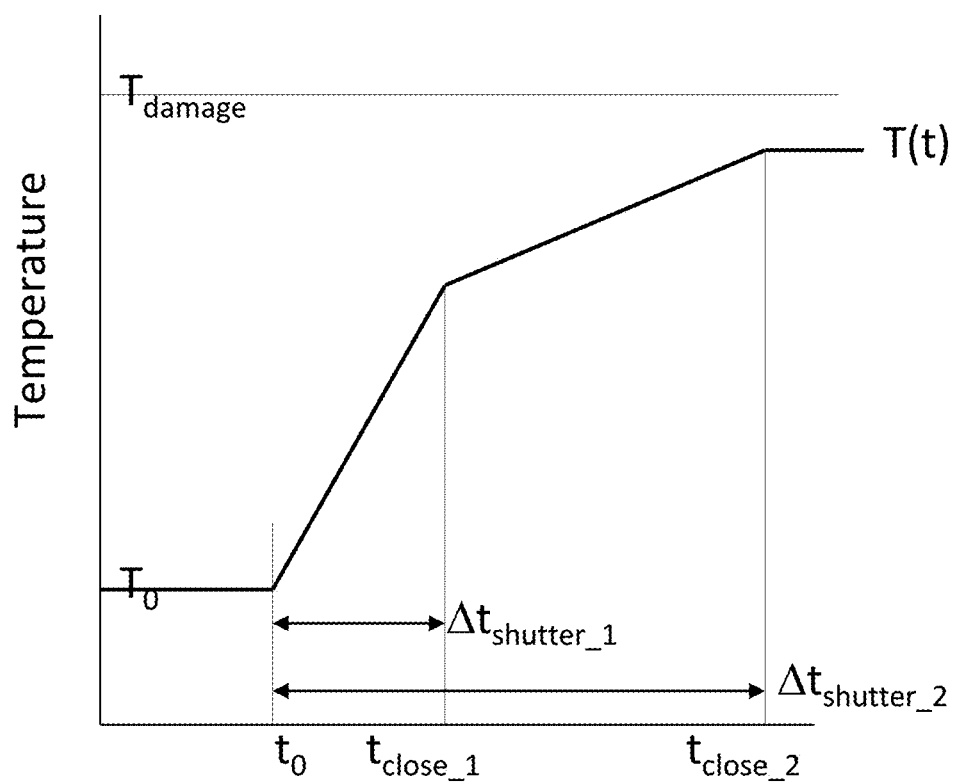
FIG. 6 is a graph of temperature at the focal plane versus time for the imaging device depicted in FIG. 5.

FIG. 6 shows how adding a mechanical shutter 22a helps protect the image sensor 14. (The signal line from the laser sensor 20 to the mechanical shutter 22a is not shown to avoid clutter in the drawing.) Given that the total shutter delay for the electro-optical shutter 22b is $\Delta t_{shutter\_1}$, the electro-optical shutter 22b closes at time $t_{close\_1}$, but since it does not block 100% of the light, the temperature of the image sensor 14 (or other image sensor) continues to rise slowly. Given that the total shutter delay $\Delta t_{shutter\_2}$ for the mechanical shutter 22a is longer than the total shutter delay $\Delta t_{shutter\_1}$ for the electro-optical shutter 22b, the mechanical shutter 22a closes at time $t_{close\_2}$, which is later than the time $t_{close\_1}$ when the electro-optical shutter 22b closed. The closed mechanical shutter blocks 100% of light, so that the temperature at the image sensor 14 (or other image sensor) rises no further (i.e., does not reach the temperature $T_{damage}$ at which damage might occur).

Figure 7:
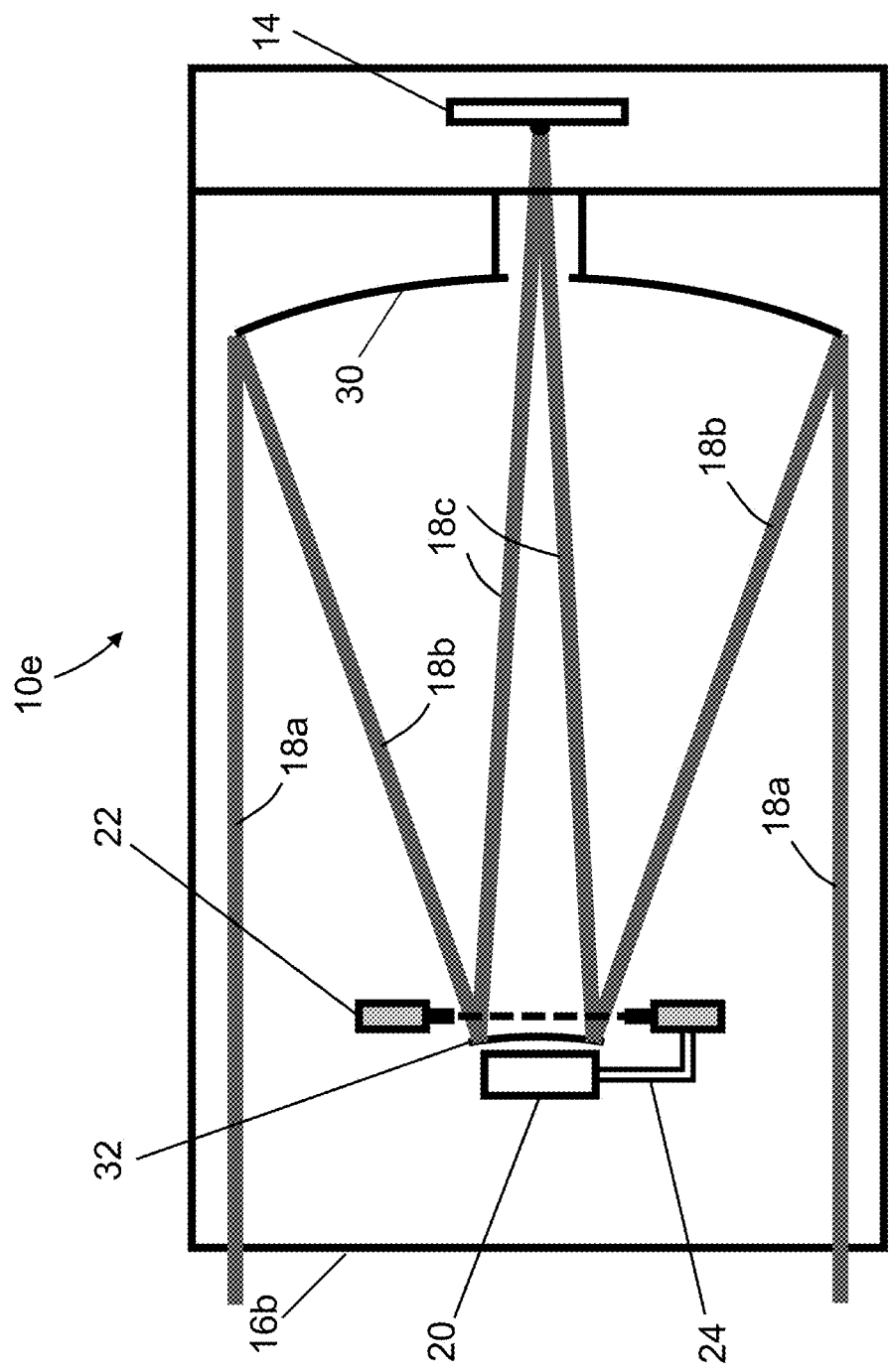
FIG. 7 is a diagram depicting structural and functional aspects of a telescope having a Cassegrain reflector, which telescope is further equipped with a protection system having a shutter near the secondary mirror in accordance with a third embodiment.

Many imaging systems use a Cassegrain optical configuration. A Cassegrain reflector is a combination of a concave primary mirror and a convex secondary mirror, often used in optical telescopes. In a symmetrical Cassegrain reflector, both mirrors are aligned about the optical axis, and the primary mirror usually contains a hole in the centre, thus permitting the light to reach an eyepiece, a camera, or a light detector. FIG. 7 depicts structural and functional aspects of a Cassegrain imaging device 10e (e.g., a telescope having a Cassegrain reflector) equipped with a protection system having a shutter 22 near the secondary mirror 32. FIG. 7 shows use of the Cassegrain primary mirror 30 as both a path-bending optical element and an image-forming optical element. The incoming light rays travel by respective long optical paths through the housing 16b. A first portion 18a of respective optical paths for two light rays extends from a point in the vicinity of the laser sensor 20 to the primary mirror 30; a second portion 18b of the respective optical paths for the two light rays extends from the primary mirror 30 to the secondary mirror 32; and a third portion 18c of the respective optical paths for the two light rays extends from the secondary mirror 32 to the image sensor 14.

A benefit of the embodiment depicted in FIG. 7 is that light passes through the shutter 22 twice on its way to the image sensor 14. This increases the effective opacity of the shutter 22: a shutter 22 that blocks 90% of the light in a single pass blocks 99% of the light in a double pass. This allows an inexpensive shutter to work as well as a more expensive one.

Figure 8:
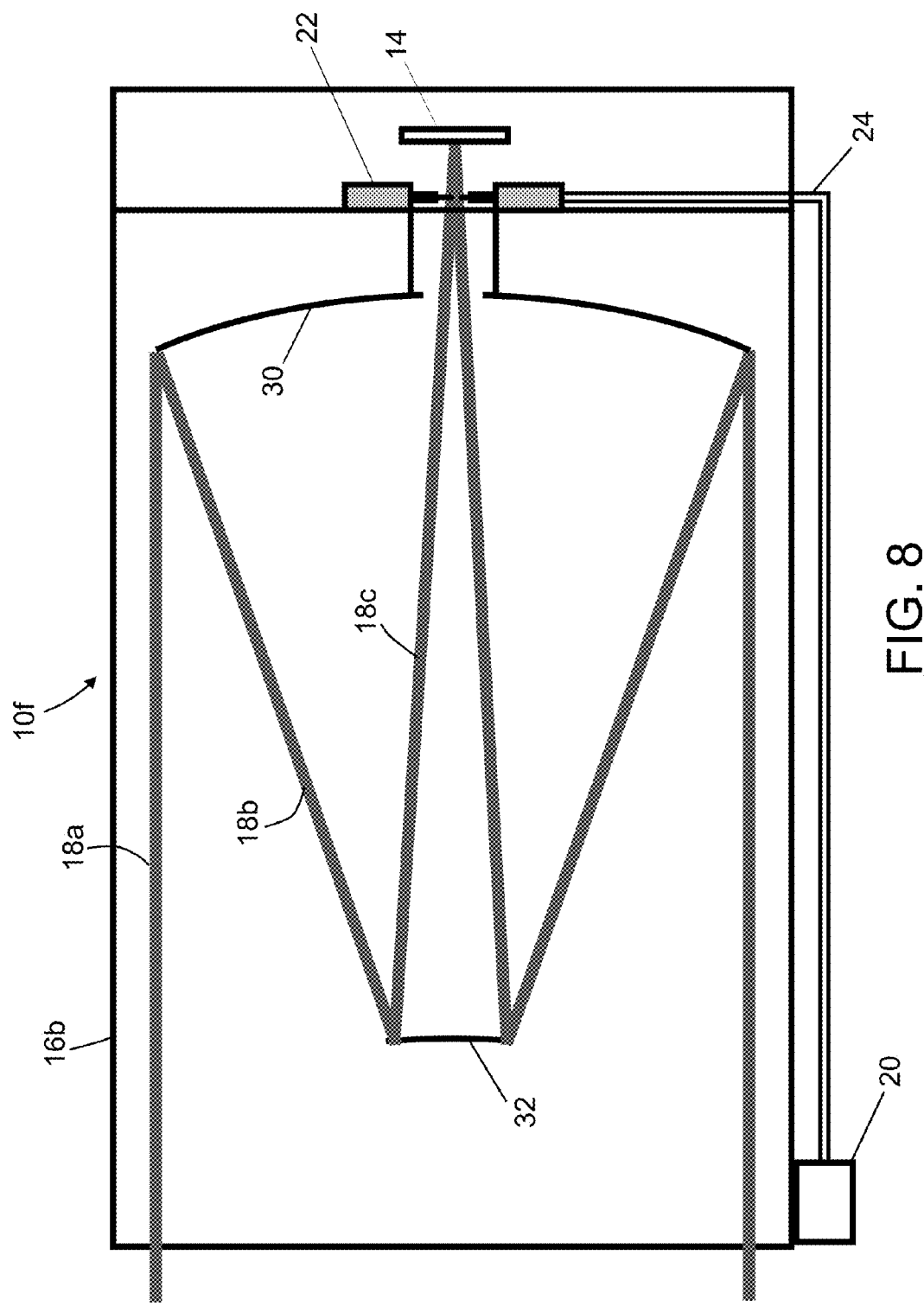
FIG. 8 is a diagram depicting structural and functional aspects of a telescope having a Cassegrain reflector, which telescope is further equipped with a protection system having a shutter behind the primary mirror in accordance with a fourth embodiment.

A disadvantage of the embodiment depicted in FIG. 7 is that hardware around the shutter 22 may block some light, reducing the performance of the telescope. FIG. 8 depicts an alternative that avoids this disadvantage. In this embodiment, a Cassegrain imaging device 10f is equipped with a protection system having a shutter 22 disposed behind the primary mirror 30 and in front of the image sensor 14. Placing the shutter 22 behind the primary mirror 30 puts the extra shutter hardware out of the optical path. In some applications, this may be preferable despite losing the double-pass advantage provided by the embodiment depicted in FIG. 7.

Figure 9:
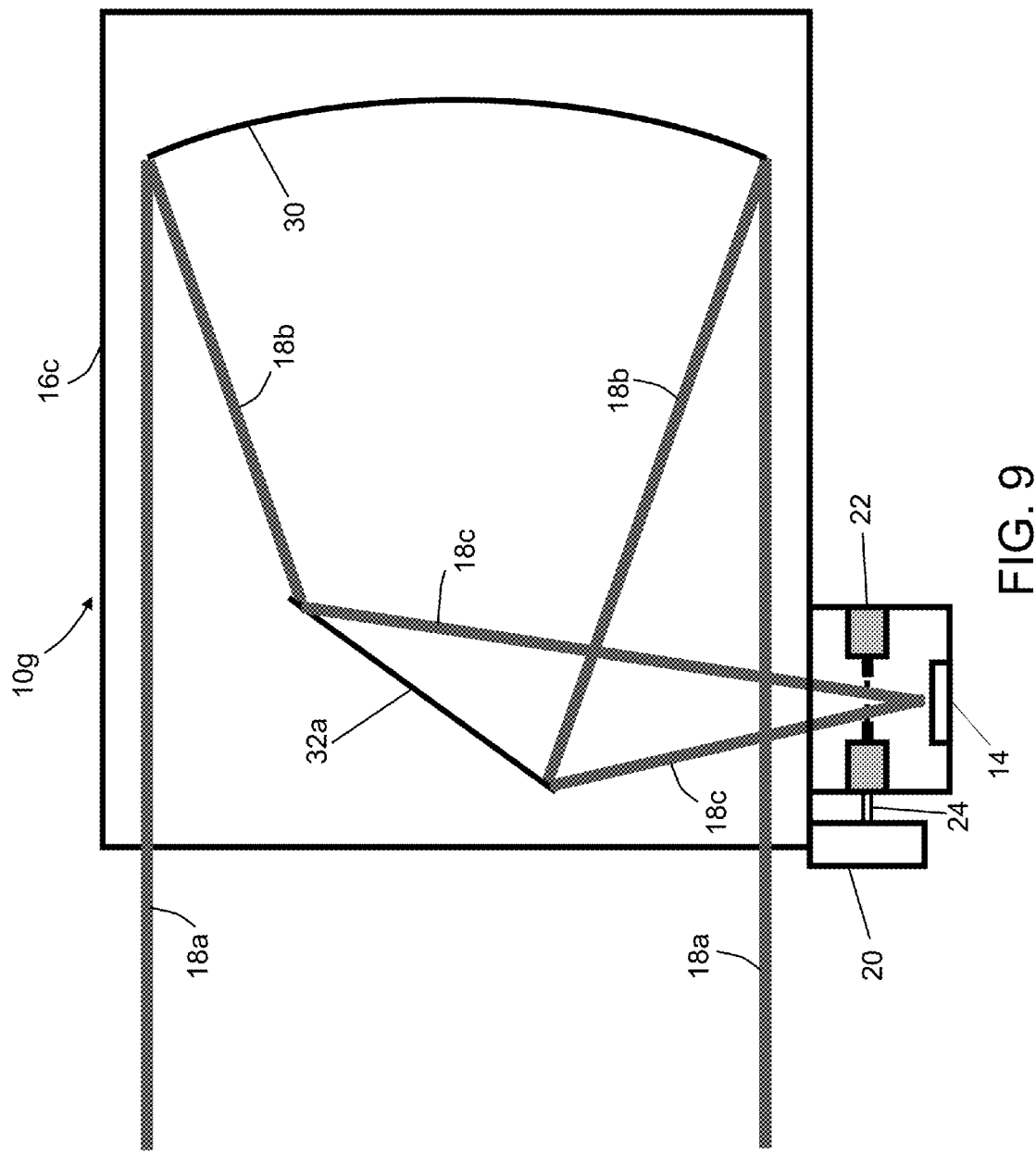
FIG. 9 is a diagram depicting structural and functional aspects of a Newtonian telescope equipped with a protection system having a shutter near the laser sensor in accordance with a fifth embodiment.

FIG. 9 depicts structural and functional aspects of a Newtonian imaging device 10g (e.g., a Newtonian telescope) equipped with a protection system having a shutter 22 near the laser sensor 20 in accordance with a further embodiment. Incoming light is reflected and focused by a concave primary mirror 30 onto a flat diagonal secondary mirror 32a the latter in turn reflects the focused beam onto the image sensor 14. This optical configuration places the shutter 22 behind an aperture in the housing 16c and very close to the laser sensor 20 and keeps the extra shutter hardware out of the optical path.

Figure 10:
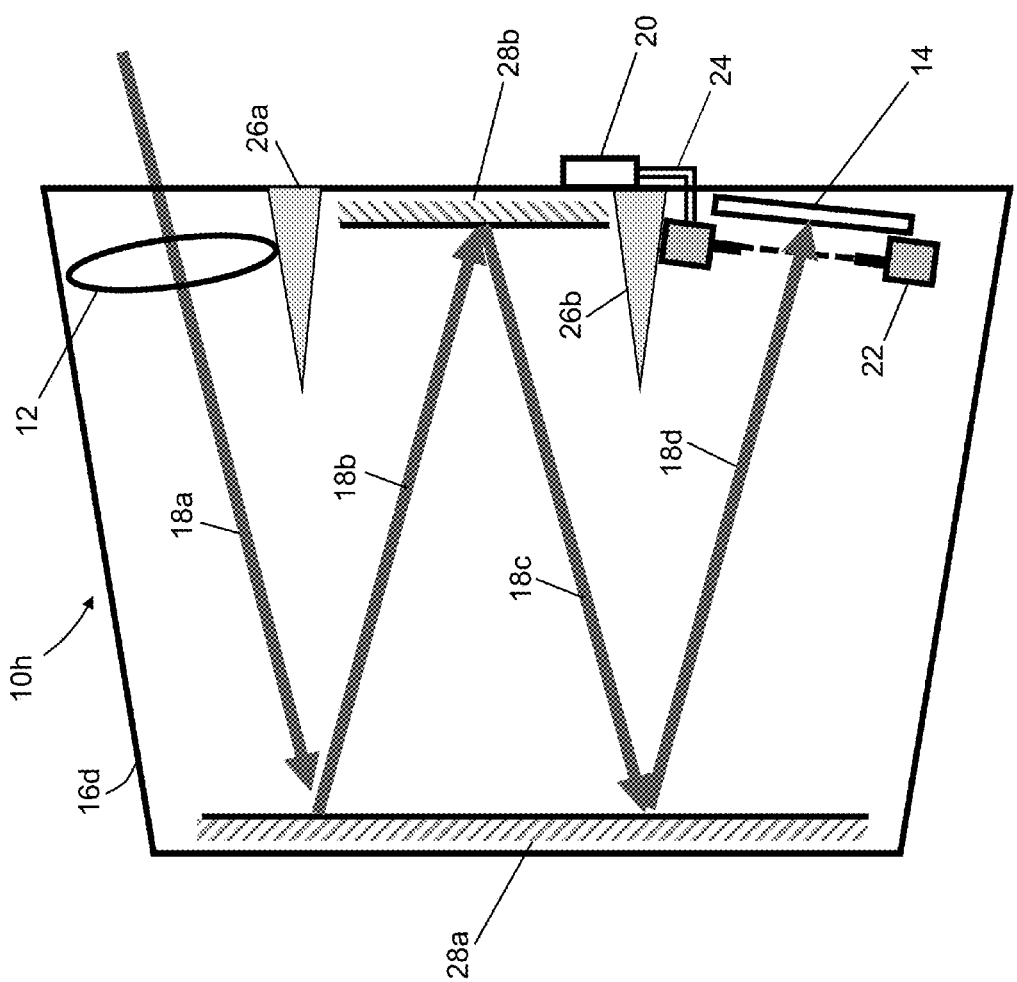
FIG. 10 is a diagram depicting structural and functional aspects of an imaging device equipped with a protection system having a shutter in accordance with a sixth embodiment in which multiple path-bending optics create a very long optical path.

FIG. 10 depicts structural and functional aspects of an imaging device 10h equipped with a protection system having a shutter 22 in accordance with an alternative embodiment in which multiple path-bending optics create a very long optical path. The imaging device 10h comprises the following elements: a lens 12, an image sensor 14, mirrors 28a and 28b, a laser sensor 20, a shutter 22, a signal line 24, a housing 16d having an aperture, and a pair of baffles 26a and 26b. As indicated by arrows in FIG. 4, the first mirror 28a reflects light from the lens 12 onto the mirror 28b; the mirror 28b reflects light from mirror 28a back onto mirror 28a; and the mirror 28a reflects light from mirror 28b toward the shutter 22. The shutter 22, when opaque, at least partially blocks the light's path to protect the image sensor 14. The optical path length from a point near the laser sensor 20 to the shutter 22 is much longer than the length of the signal line 24 from the laser sensor 20 to the shutter 22. More specifically, the incoming laser light travels by a long optical path through the housing 16d. A first portion 18a of that optical path (indicated by a first arrow in FIG. 10) extends from a point in the vicinity of the laser sensor 20 to the mirror 28a; a second portion 18b of that optical path (indicated by a second arrow) extends from the mirror 28a to the mirror 28b; a third portion 18c of that optical path (indicated by a third arrow) extends from the mirror 28b to the mirror 28a; and finally a fourth portion 18d of that optical path (indicated by a fourth arrow) extends from the mirror 28a to the shutter 22.

In the embodiments depicted in FIGS. 4, 5 and 7-9, the imaging device has one or two major bends in the optical path. The embodiment depicted in FIG. 10 use multiple path-bending optics to create very long optical paths in limited physical space. For simplicity of illustration, the version shown here keeps the optical path roughly in a single plane and has non-crossing legs in the optical paths. More complicated embodiments minimize the device's volume by having optical path legs that cross, e.g., in a star pattern or a three-dimensional mesh. Multiple reflecting surfaces can introduce substantial optical errors, so some embodiments use adaptive optics between the shutter and the image sensor to correct any errors.

In the previously described embodiments, the apparatus included a folded optical path. Another way to delay the arrival of high-radiant-flux light at an image sensor is to use a substance having a high index of refraction to delay the time-of-flight.

Figure 11:
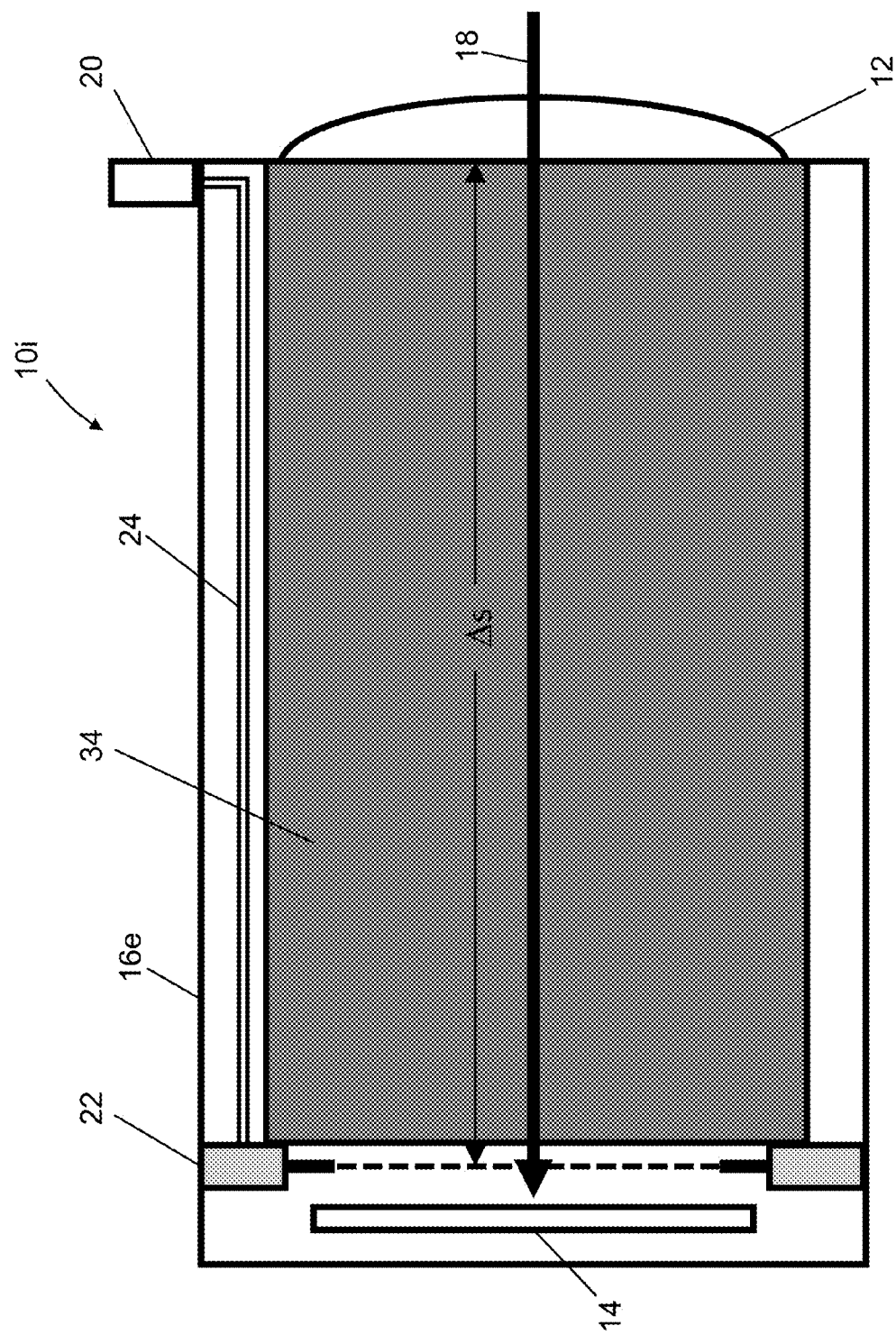
FIG. 11 is a diagram depicting structural and functional aspects of an imaging device equipped with a protection system having a shutter in accordance with a seventh embodiment in which the optical path is effectively lengthened by a substance with high index of refraction.

FIG. 11 depicts structural and functional aspects of an imaging device 10i in accordance with a further alternative embodiment. In this configuration, a portion of the optical path 18 is filled with a transparent substance 34 (solid, liquid, or gas) that has a high index of refraction n. That is, the speed of light in the material is slowed by a factor of, say, 1.33 (water) to as much as 4.0 (germanium, used in long-wave infrared imagers) or higher (exotic substances such as Bose-Einstein condensate). Thus the optical path is effectively lengthened by the high-index substance 34 disposed inside the housing 16e. Signals propagating along the signal line 24 are not slowed, so they can travel as fast as the speed of light in vacuum. Given an optical path of sufficient length, the activation signal reaches the shutter 22 well in advance of the high-radiant-flux light. The shutter 22 becomes opaque (i.e., closes) before the light reaches it whenever the following relation is true:

$$n\Delta s/c > \Delta t_{shutter} \quad (3)$$

More generally, the optical path may comprise multiple legs, each leg i having length $\Delta s_i$ and index of refraction $n_i$. In this case, the appropriate relation is:

$$(\Sigma n_i \Delta s_i)/c > \Delta t_{shutter} \quad (4)$$

where $\Sigma$ denotes a sum over all legs.

Some embodiments can use both a folded optical path and a path that is at least partially filled with a high-index substance. In addition, when a path-bending element is a prism, the refractive index of the prism is at least 1.3, so light traveling through it incurs a substantial delay. In some embodiments, the prism is designed to have a large internal path length and to incorporate material with unusually high index of refraction.

The embodiments described above each have a shutter between the image-forming optics and the image sensor. In some embodiments, typically those where the image-forming optics have a short focal length, the image-forming optics may be between the shutter and the image sensor (i.e., "downstream" of the shutter). The path-bending optics and the laser sensor would remain "upstream" of the shutter.

Figure 12:
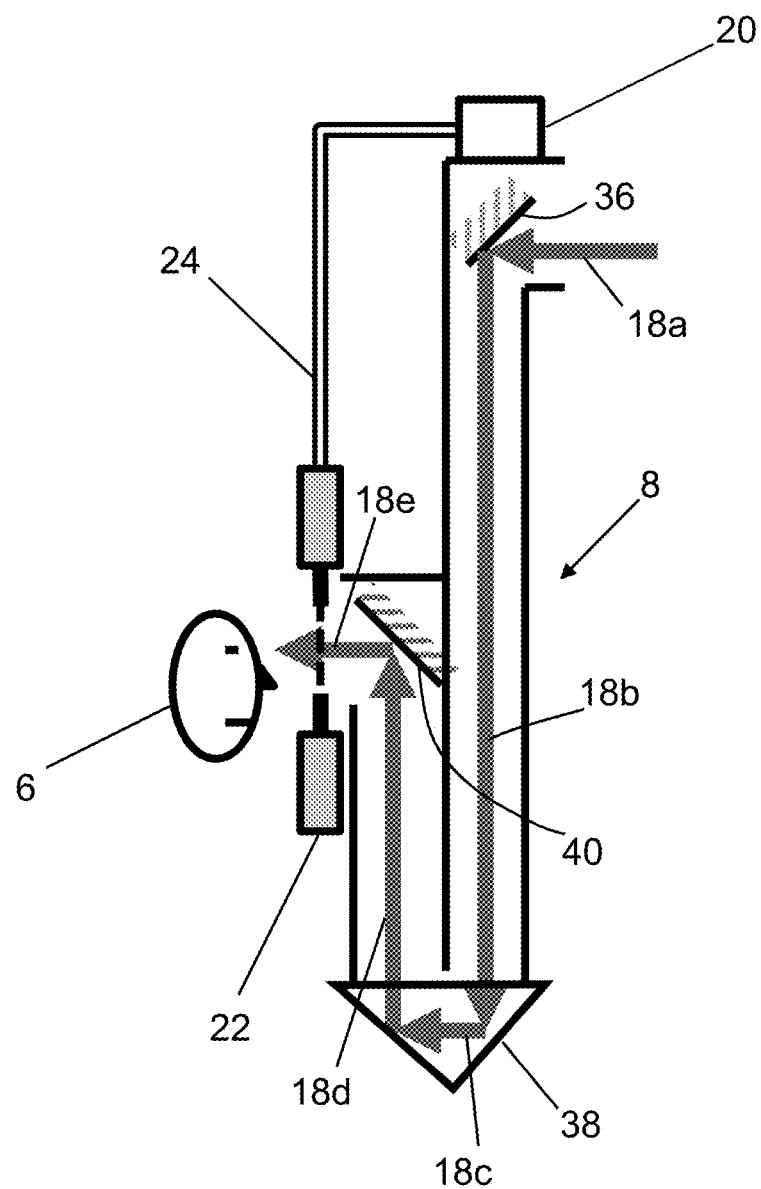
FIG. 12 is a diagram depicting structural and functional aspects of a periscope equipped with a protection system having a shutter and an extended optical path in accordance with an eighth embodiment.

A special case of putting the image-forming optics "downstream" of the shutter is an embodiment that protects a human observer, i.e., the image-forming optics and the image sensor are both part of a human eye. Prior art includes many forms of periscope: those used in submarines, in armored turrets on tanks, fortresses, and naval vessels, in trench warfare, and in covert surveillance by police. FIG. 12 is a diagram depicting structural and functional aspects of a periscope 8 equipped with a protection system having a shutter 22 placed in front of the eye of a human observer 6 and further having an extended optical path. The extended optical path through the periscope 8 allows shutter 22 to close before high-radiant-flux light reaches the eye of the human observer 6.

In the embodiment depicted in FIG. 12, the regular periscope structure is extended below the viewer's eye to increase the optical path. (Other parts of the periscope optics are omitted for clarity.) This longer path allows the signal from the laser sensor 20 to reach the shutter 22 before the high-radiant-flux light reaches the shutter 22. A first portion 18a of that optical path (indicated by a first arrow in FIG. 12) extends from a point in the vicinity of the laser sensor 20 to the mirror 36; a second portion 18b of that optical path (indicated by a second arrow) extends from the mirror 36 to a first facet of a prism 38; a third portion 18c of that optical path (indicated by a third arrow) extends from the first facet of prism 38 to a second facet of prism 38; and finally a fourth portion 18d of that optical path (indicated by a fourth arrow) extends from the mirror 28a to the shutter 22.

In other embodiments (not shown), the forward opening of the periscope can be at the same height as the human observer. In these embodiments, the point is not to see over an obstacle, but rather simply to protect the observer's eyes from high-radiant-flux laser light or other high-radiant-flux light.

Alternative criteria for shutter closure may be employed. The activation threshold may be based on radiant intensity (e.g., watts per steradian), irradiance (e.g., watts per square meter), or radiance (e.g., watts per steradian per square meter). Slightly different laser sensors can be employed depending on whether radiance or irradiance is being detected. To detect irradiance, the laser sensor may comprise a single photodetector. To detect radiance, the laser sensor should comprise a focusing element, a photosensitive chip with multiple pixels, and a processor that issues the activation signal when the amount of light on one pixel exceeds the threshold.

While imaging devices and instruments having means for laser protection have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. An imaging device comprising:
    a laser sensor configured to output an activation signal in response to impingement thereon of light having a radiant flux greater than a specified threshold;
    an image sensor comprising a multiplicity of elements that convert impinging light to electrical signals;
    a first path-bending optical component disposed along an optical path that extends from a point in a vicinity of said laser sensor to said image sensor;
    a first shutter disposed along a portion of said optical path that extends from said first path-bending optical component to said image sensor; and
    a signal line connected to carry said activation signal from said laser sensor to said first shutter.

2. The imaging device as recited in claim 1, wherein said laser sensor, said signal line and said first shutter are configured so that in response to first and second light beams, both having a radiant flux greater than said specified threshold, concurrently arriving at said laser sensor and a starting point of said optical path respectively, said first shutter will become opaque prior to said other light impinging thereon in response to receipt of said activation signal from said laser sensor via said signal line.

3. The imaging device as recited in claim 1, wherein the optical path is configured to produce a time-of-flight delay for light traveling from the vicinity of said laser sensor to said first shutter, and said laser sensor, said signal line, and said first shutter are configured to produce a shutter delay from the time a high-radiant-flux arrives at said laser sensor to the time said first shutter becomes opaque, wherein the time-of-flight delay is greater than the shutter delay.

4. The imaging device as recited in claim 1, wherein said first path-bending optical component comprises a first mirror.

5. The imaging device as recited in claim 4, further comprising a second mirror disposed along said optical path, wherein light traveling along said optical path will be incident on a first portion of said first mirror, said second mirror, and a second portion of said first mirror in sequence, said first shutter being disposed along a portion of said optical path that extends from said second portion of said first mirror to said image sensor.

6. The imaging device as recited in claim 4, further comprising a second mirror disposed along said optical path, wherein light traveling along said optical path will be incident on said first mirror and then said second mirror in sequence, said first shutter being intersected by a first portion of said optical path that extends from said first mirror to said second mirror and a second portion of said optical path that extends from said second mirror to said image sensor.

7. The imaging device as recited in claim 4, further comprising a second mirror disposed along said optical path, wherein light traveling along said optical path will be incident on said first mirror and then said second mirror in sequence, said first shutter being disposed along a portion of said optical path that extends from said second mirror to said image sensor.

8. The imaging device as recited in claim 1, wherein said image sensor comprises a focal plane array.

9. The imaging device as recited in claim 1, further comprising a second shutter disposed along a portion of said optical path that extends from said first path-bending optical component to said first shutter.

10. The imaging device as recited in claim 9, wherein said first shutter comprises an electro-optical shutter and said second shutter comprises a mechanical shutter.

11. An instrument comprising:
    a laser sensor configured to output an activation signal in response to impingement thereon of light having a radiant flux greater than a specified threshold;
    a first path-bending optical component disposed along an optical path that extends from a point in a vicinity of said laser sensor to a focal plane of the instrument;
    a shutter disposed along a portion of said optical path that extends from said first path-bending optical component to said focal plane; and
    a signal line connected to carry said activation signal from said laser sensor to said shutter.

12. The instrument as recited in claim 11, wherein said laser sensor, said signal line and said shutter are configured so that in response to some light and other light, both having a radiant flux greater than said specified threshold, concurrently arriving at said laser sensor and a starting point of said optical path respectively, said shutter will become opaque prior to said other light impinging thereon in response to receipt of said activation signal from said laser sensor via said signal line.

13. The instrument as recited in claim 11, wherein the optical path is configured to produce a time-of-flight delay for light traveling from the vicinity of said laser sensor to said shutter, and said laser sensor, said signal line, and shutter are configured to produce a shutter delay from the time a high-radiant-flux light arrives at said laser sensor to the time said shutter becomes opaque, wherein the time-of-flight delay is greater than the shutter delay.

14. The instrument as recited in claim 11, further comprising second, third and fourth path-bending optical components, wherein said second path-bending optical component is disposed along a portion of said optical path that extends from said first path-bending optical component to said focal plane, said third path-bending optical component is disposed along a portion of said optical path that extends from said second path-bending optical component to said focal plane, and said fourth path-bending optical component is disposed along a portion of said optical path that extends from said third path-bending optical component to said focal plane.

15. The instrument as recited in claim 14, wherein each of said first through fourth path-bending optical components is one of a mirror and a facet of a prism.

16. The instrument as recited in claim 14, further comprising an image sensor disposed at said focal plane.

17. An imaging device comprising:
    a laser sensor configured to output an activation signal in response to impingement thereon of light having a radiant flux greater than a specified threshold;
    an image sensor comprising a multiplicity of elements that convert impinging light to electrical signals;

means for increasing a time-of-flight of light along an optical path that extends from a point in a vicinity of said laser sensor to said image sensor;

a shutter disposed along a portion of said optical path that extends from said volume of substance having a high index of refraction to said image sensor; and a signal line connected to carry said activation signal from said laser sensor to said first shutter.

18. The imaging device as recited in claim 17, wherein said means for increasing a time-of-flight of light along an optical path comprise a volume of substance having a high index of refraction.

19. The imaging device as recited in claim 17, wherein said means for increasing a time-of-flight of light along an optical path comprise one or more reflective surfaces.

20. The imaging device as recited in claim 17, wherein said laser sensor, said signal line and said shutter are configured so that in response to some light and other light, both having a radiant flux greater than said specified threshold, concurrently arriving at said laser sensor and a starting point of said optical path respectively, said shutter will become opaque prior to said other light impinging thereon in response to receipt of said activation signal from said laser sensor via said signal line.

21. A method comprising:
(a) detecting light entering an optical instrument that has a radiant flux above a specified threshold;
(b) when the specified threshold is reached or exceeded, sending an activation signal via a signal line to a shutter disposed inside the optical instrument;
(c) delaying the arrival of the entering light at a shutter inside the optical instrument by an amount of time equal to a time-of-flight delay; and
(d) in response to sending of the activation signal, the shutter becomes opaque at a time which is subsequent to a time when step (a) occurs by a total shutter delay,
wherein the time-of-flight delay is greater than the total shutter delay.

\* \* \* \* \*